(12) United States Patent
Kim et al.

(10) Patent No.: US 9,819,529 B2
(45) Date of Patent: Nov. 14, 2017

(54) METHOD AND APPARATUS FOR REPEATED TRANSMISSION IN MULTICARRIER WIRELESS COMMUNICATION SYSTEM

(71) Applicant: Samsung Electronics Co., Ltd, Gyeonggi-do (KR)

(72) Inventors: Chanhong Kim, Gyeonggi-do (KR); Kyeongyeon Kim, Gyeonggi-do (KR); Yeohun Yun, Gyeonggi-do (KR); Ming Hoka, Gyeonggi-do (KR); Jiyun Seol, Gyeonggi-do (KR); Yongho Cho, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/292,036

(22) Filed: Oct. 12, 2016

(65) Prior Publication Data

US 2017/0104620 A1    Apr. 13, 2017

(30) Foreign Application Priority Data

Oct. 12, 2015    (KR) .................. 10-2015-0142385

(51) Int. Cl.
| | | |
|---|---|---|
| H04L 27/34 | (2006.01) | |
| H04L 27/26 | (2006.01) | |
| H04W 52/60 | (2009.01) | |
| H04W 40/22 | (2009.01) | |
| H04W 88/02 | (2009.01) | |
| H04W 88/08 | (2009.01) | |

(52) U.S. Cl.
CPC ............ *H04L 27/34* (2013.01); *H04L 27/264* (2013.01); *H04W 40/22* (2013.01); *H04W 52/60* (2013.01); *H04W 88/02* (2013.01); *H04W 88/08* (2013.01)

(58) Field of Classification Search
CPC ...... H04L 27/34; H04L 27/264; H04W 40/22; H04W 52/60; H04W 88/08; H04W 88/02
See application file for complete search history.

(56) References Cited

U.S. PATENT DOCUMENTS

| | | | | |
|---|---|---|---|---|
| 8,249,181 B2* | 8/2012 | Miyoshi | ................ | H04L 5/0044 375/260 |
| 8,670,318 B2* | 3/2014 | Komura | ................ | H04L 1/1607 370/231 |
| 2014/0293956 A1 | 10/2014 | Kwon et al. | | |

(Continued)

*Primary Examiner* — Jean B Corrielus (57) ABSTRACT

A method for signal transmission includes determining whether to perform repeated transmissions for a time length of a multiplication of L and M or more, wherein L indicates the overlapping factor of the system and M indicates a number of quadrature amplitude modulation (QAM) filter bank multi-carrier (FBMC) symbols, determining information on a type of the repeated transmissions to be performed, and transmitting FBMC symbols using a transmit power determined based on the type of the repeated transmissions. A base station includes a transceiver unit to send and receive signals, a control unit configured to determine whether to perform repeated transmissions for a time length of a multiplication of L and M or more, determine information on a type of the repeated transmissions to be performed, and transmit FBMC symbols using a transmit power determined based on the type of the repeated transmissions.

14 Claims, 12 Drawing Sheets

(56) References Cited

U.S. PATENT DOCUMENTS

2016/0165640 A1* 6/2016 Yang ................ H04W 4/005 370/336
2016/0381712 A1* 12/2016 Yang ................ H04W 4/005 370/329

* cited by examiner

METHOD AND APPARATUS FOR REPEATED TRANSMISSION IN MULTICARRIER WIRELESS COMMUNICATION SYSTEM

CROSS-REFERENCE TO RELATED APPLICATION(S) AND CLAIM OF PRIORITY

The present application is related to and claims priority from and the benefit under 35 U.S.C. §119(a) of Korean Patent Application No. 10-2015-0142385, filed on Oct. 12, 2015, which is hereby incorporated by reference for all purposes as if fully set forth herein.

TECHNICAL FIELD

The present disclosure relates to a method and apparatus for repeated transmission in a multicarrier wireless communication system employing pulse shaping filters (PSF) for overlapping transmissions.

BACKGROUND

Since deployment of 4G communication systems, to meet the ever increasing demand for wireless data traffic, efforts have been made to develop improved 5G or pre-5G communication systems. As such, 5G or pre-5G communication systems are also called "beyond 4G network" or "post LTE system".

To achieve higher data rates, utilization of the extremely high frequency band (e.g. 60 GHz mmWave band) is considered to implement 5G communication systems. To decrease path loss and increase the transmission distance in the extremely high frequency band, various technologies including beamforming, massive multiple-input multiple-output (massive MIMO), full dimensional MIMO (FD-MIMO), array antennas, analog beamforming, and large scale antennas are considered for 5G communication systems.

To improve system networks in 5G communication systems, technology development is under way regarding advanced small cells, cloud radio access networks (cloud RANs), ultra-dense networks, device-to-device (D2D) communication, wireless backhaul, moving networks, cooperative communication, coordinated multi-points (CoMP), reception interference cancellation, and the like.

In addition, advanced coding and modulation (ACM) schemes such as hybrid FSK and QAM modulation (FQAM) and sliding window superposition coding (SWSC), and advanced access technologies such as filter bank multi carrier (FBMC), non-orthogonal multiple access (NOMA), and sparse code multiple access (SCMA) are also under development for 5G communication systems.

SUMMARY

To address the above-discussed deficiencies, it is a primary object to provide a method and apparatus for repeated transmission in a multicarrier wireless communication system.

Another aspect of the present disclosure is to provide a method and apparatus for repeated transmission in a multicarrier wireless communication system employing pulse shaping filters (PSF) for overlapping transmissions.

In accordance with an aspect of the present disclosure, a method for signal transmission in a filter bank multicarrier (FBMC) system includes determining whether to perform repeated transmissions for a time length of a multiplication of L and M or more, wherein L indicates the overlapping factor of the system and M indicates a number of quadrature amplitude modulation (QAM) filter bank multi-carrier (FBMC) symbols, determining information on a type of the repeated transmissions to be performed, and transmitting FBMC symbols using a transmit power determined based on the type of the repeated transmissions.

In accordance with another aspect of the present disclosure, a base station in a filter bank multicarrier (FBMC) system includes a transceiver unit to send and receive signals, a control unit configured to determine whether to perform repeated transmissions for a time length of a multiplication of L and M or more, when L indicates the overlapping factor of the system and M indicates the number of QAM FBMC symbols, determine information on a type of the repeated transmissions to be performed, and transmit FBMC symbols using a transmit power determined based on the type of the repeated transmissions.

In accordance with another aspect of the present disclosure, a user equipment in a filter bank multicarrier (FBMC) system includes a transceiver unit configured to send and receive signals, and a control unit to cause the transceiver to send information on the maximum overlapping factor allowed to the user equipment to a base station, cause the transceiver to receive information on a type of repeated transmissions to be performed for a time length of a multiplication of L and M or more, wherein L indicates the overlapping factor of the system and M indicates the number of QAM FBMC symbols, reconfigure reception filters on a basis of the information on the type of repeated transmissions, and cause the transceiver to receive a signal by use of the reconfigured reception filters.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, embodiments of the present disclosure are described in detail with reference to the accompanying drawings.

Cyclic prefixed orthogonal frequency division multiplexing (CP-OFDM) is currently used for wireless communication networks like LTE and Wi-Fi. CP-OFDM has various advantages such as enabling efficient subchannelization for broadband multiple access, permitting use of a low-complexity channel equalizer based on a cyclic prefix (CP) even in a multi-path fading environment, and enabling use of per-subcarrier multi-antenna transmission and reception (MIMO) through orthogonality of subcarriers. However, to obtain the above advantages, it is required to satisfy strict time/frequency synchronization constraints and to bear the time overhead of CPs.

Beyond 4G or 5G wireless communication networks need advanced transmission schemes that can not only provide higher data rates but also accommodate heterogeneous services with different requirements in a flexible and efficient manner. In particular, to realize Internet of Things (IoT) services, the advanced transmission schemes should be able to efficiently support asynchronous environments where synchronization constraints are relaxed or absent in connection with machine-to-machine (M2M) or machine-type communication (MTC), coordinated multi-point (CoMP) communication, and dynamic spectrum access (DSA) to fragmented spectrum. For multicarrier wireless systems using rectangular pulses like OFDM, there is a serious problem of interference between neighboring subchannels in the case of time/frequency offsets. In this regard, recently, new multicarrier transmission schemes using pulse shaping filters (PSF), such as Generalized Frequency Division Multiplexing (GFDM), Bi-orthogonal Frequency Division Multiplexing (BFDM), Filter-Bank Multi-Carrier (FBMC) and Filtered Multi-Tone (FMT), have been proposed as a candidate 5G transmission technology.

The multicarrier transmission schemes using PSFs described above are common in that they apply a pulse shaping filter to a signal composed of IFFT symbols repeated several times (the number of repetitions is commonly referred to as the overlapping factor) to generate one transmission symbol, although differing in terms of symbol overlapping and CP utilization.

Figure 1:
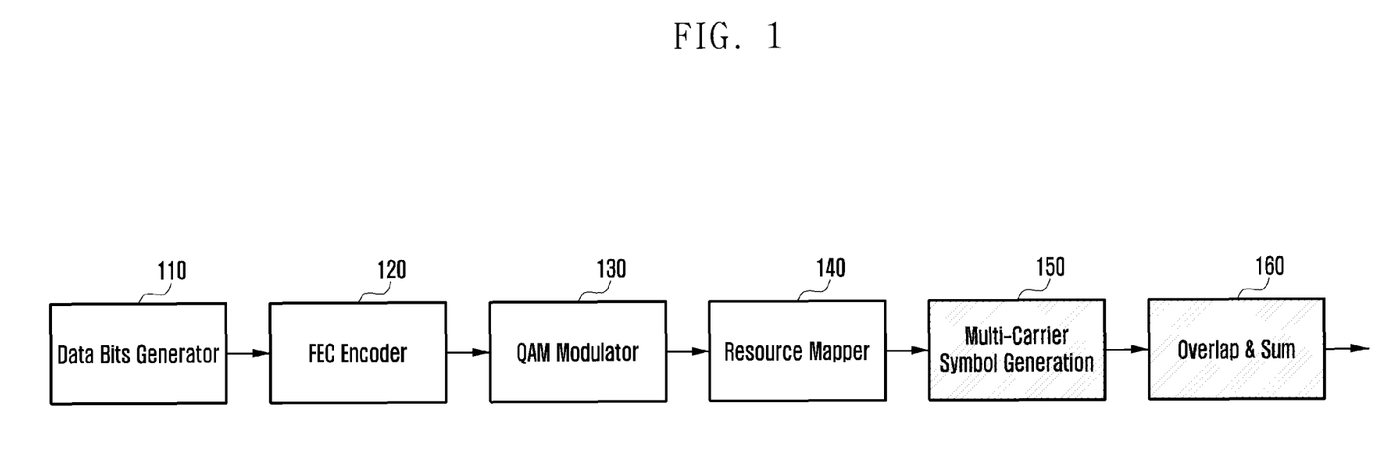
FIG. 1 illustrates PSF-based multicarrier transmission for QAM symbols according to an embodiment of the present disclosure.

FIG. 1 illustrates PSF-based multicarrier transmission for QAM symbols according to an embodiment of the present disclosure.

Referring to FIG. 1, a QAM-FBMC system 100 can include a data bits generator 110, an FEC (forward error correction) encoder 120, a QAM modulator 130, a resource mapper 140, a symbol generator 150, and an overlap and sum module 160.

The data bits generator 110 generates data bits to be sent, the FEC encoder 120 performs channel coding (turbo coding), and the QAM modulator 130 performs QAM modulation. However, operations for resource allocation by the resource mapper 140, FBMC symbol generation by the symbol generator 150, and final transmission symbol generation through the overlap and sum module 160 in QAM-FBMC are different from those in OFDM.

The QAM-FBMC system 100 can be a transmitter or base station. The QAM-FBMC system 100 can also be a transmitter or subordinate unit of a base station. For example, the QAM-FBMC system 100 can be referred to as a transmitter, a base station controller, or a QAM-FBMC controller. Here, the controller or QAM-FBMC controller can perform operations corresponding to those of the data bits generator 110, FEC encoder 120, QAM modulator 130, resource mapper 140, symbol generator 150, and overlap and sum module 160. As such, the configuration of the QAM-FBMC system 100 is not limited to that shown in FIG. 1.

Figure 2:
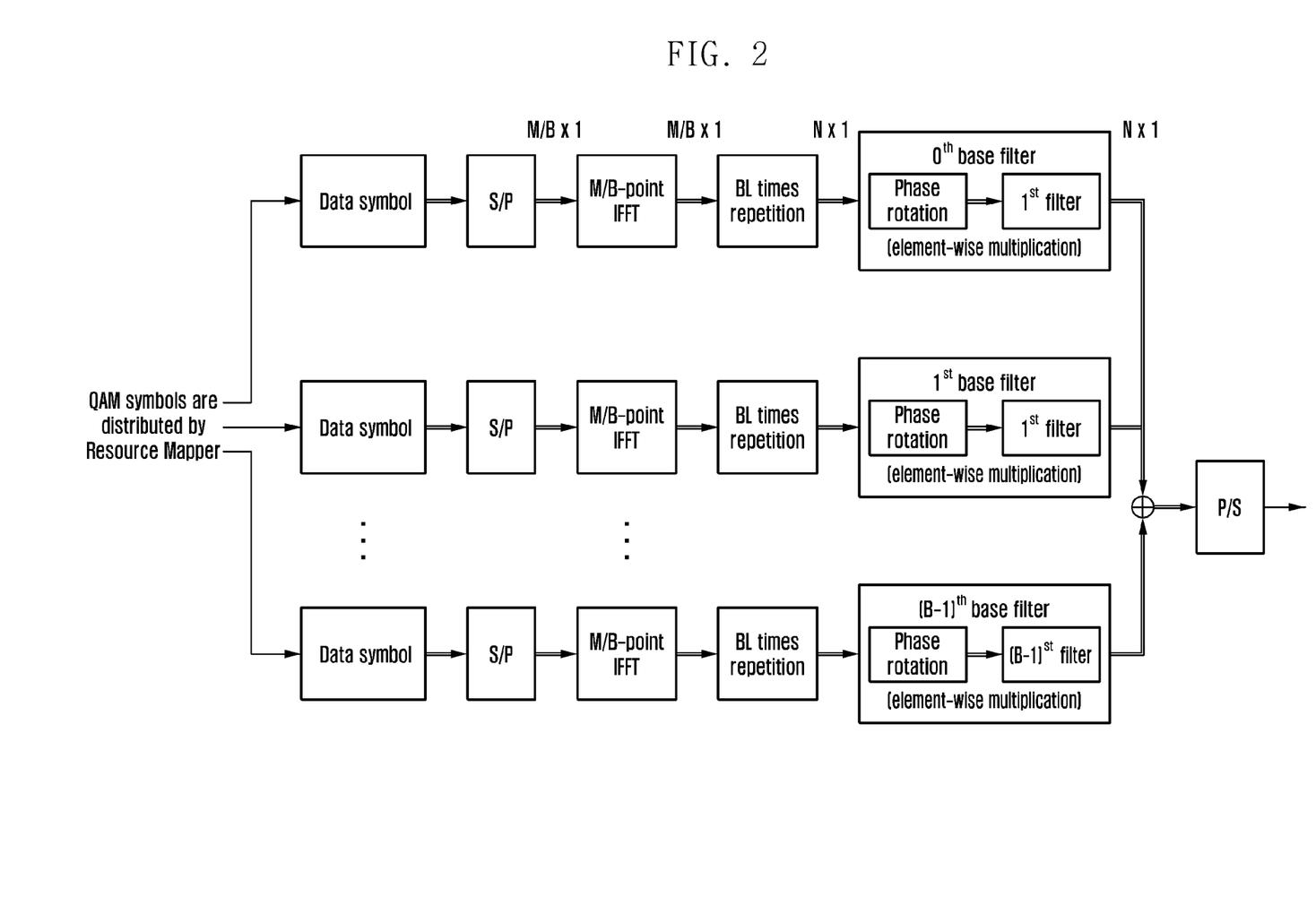
FIG. 2 illustrates symbol generation in a QAM-FBMC system according to an embodiment of the present disclosure.

FIG. 2 illustrates symbol generation in the QAM-FBMC system according to an embodiment of the present disclosure.

FIG. 2 illustrates a realization of one instance of the symbol generator 150 shown in FIG. 1. That is, FIG. 2 shows a block for generating one QAM-FBMC symbol implemented by a filter bank in the time domain. In the existing OFDM system, M QAM symbols are converted into one OFDM symbol through inverse fast Fourier transform (IFFT). In the QAM-FBMC system, M QAM symbols are divided into B groups of MB QAM symbols, the individual QAM symbol groups are fed to different filter banks (MB-IFFT+BL times repetition+phase rotation+filter coefficient multiplication), and the outputs of the filter banks are summed finally to form one FBMC symbol. Here, phase rotation can be skipped according to the design of the base filter. As the filter bank can be implemented in the frequency domain, one FBMC symbol can be generated through a scheme different from that depicted in FIG. 2.

Figure 3:
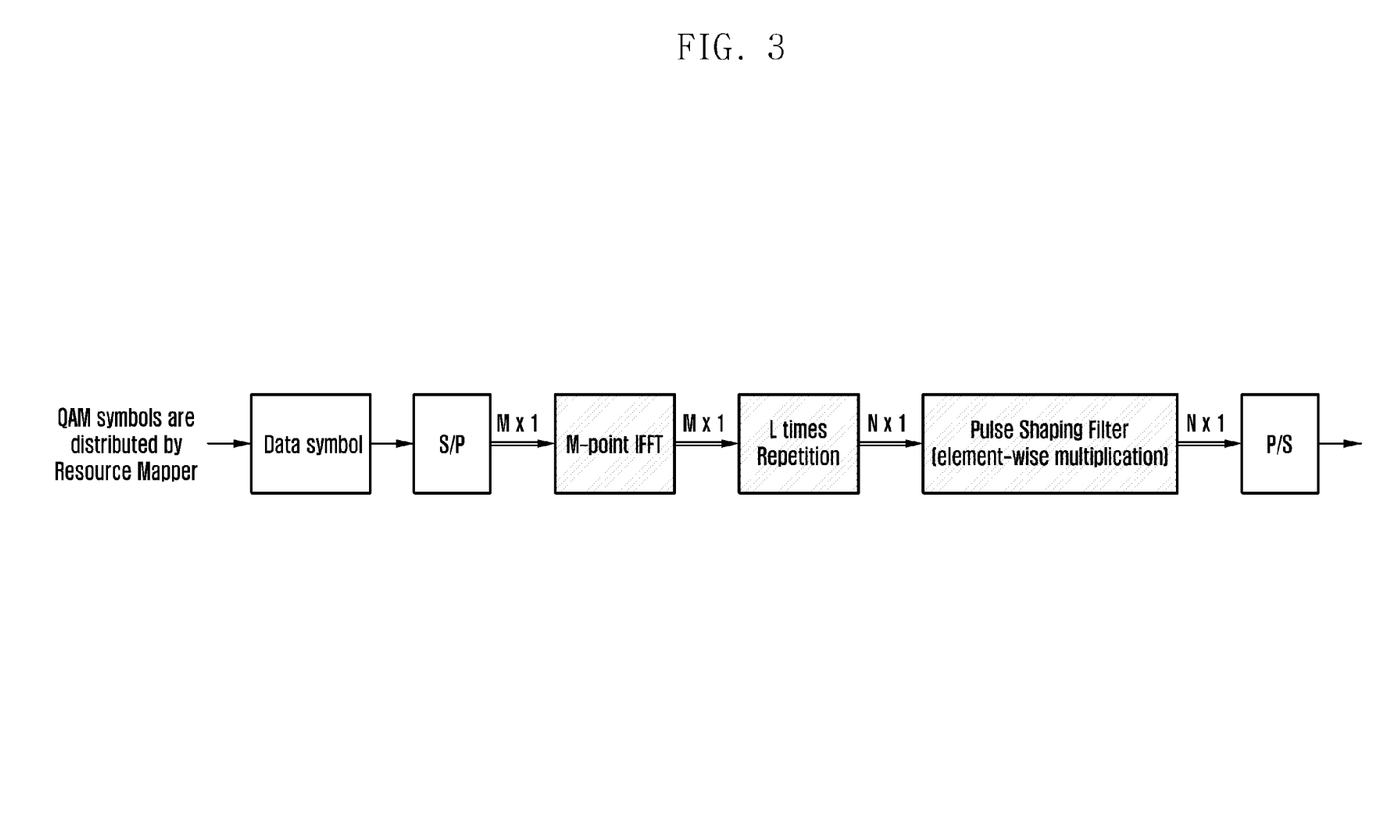
FIG. 3 illustrates BFDM/GFDM/FMT symbol generation according to an embodiment of the present disclosure.

FIG. 3 illustrates BFDM/GFDM/FMT symbol generation according to an embodiment of the present disclosure.

FIG. 3 illustrates a realization of one instance of symbol generation shown in FIG. 1. That is, like FIG. 2, FIG. 3 shows a block for generating one multicarrier symbol based on the PSF implemented in the time domain. Although the blocks in FIG. 2 and FIG. 3 are different due to the number of filter banks used for implementation, they follow the same rule that M QAM symbols are divided into B groups of MB QAM symbols, the individual QAM symbol groups are fed to different filter banks (MB-IFFT+BL times repetition+ phase rotation+filter coefficient multiplication), and the outputs of the filter banks are summed finally to form one multicarrier symbol. They can differ in terms of use of a poly-phase network and frequency domain pre-IFFT filtering according to implementation but have the same functionality. FIG. 3 is an example of multicarrier symbol generation with B=1, which can correspond to a multicarrier system using a single filter bank composed of one prototype filter, such as GFDM, BFDM or FMT.

Figure 4:
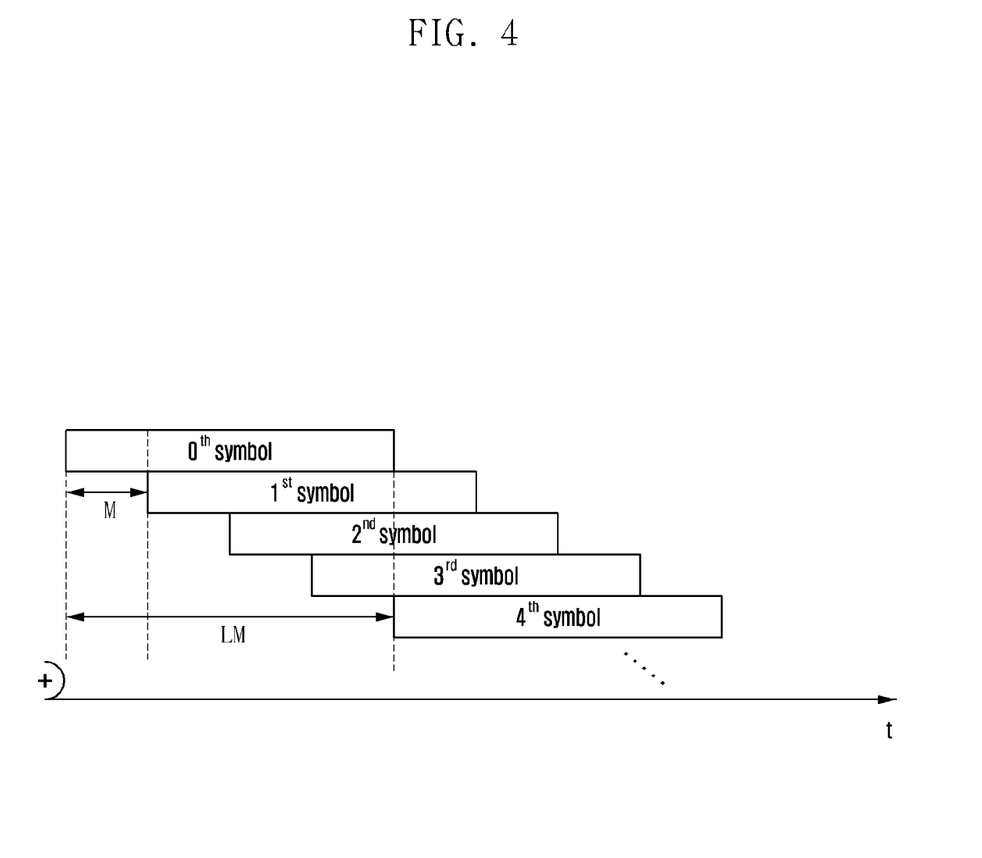
FIG. 4 illustrates the overlap and sum operation in a QAM system according to an embodiment of the present disclosure.

FIG. 4 illustrates the overlap and sum operation in a QAM system according to an embodiment of the present disclosure.

FIG. 4 illustrates a process in which multicarrier symbols generated by the process of FIG. 2 or 3 are shifted by M (corresponding to the Nyquist transmission rate) to be overlapped and are summed together. Here, L is the overlapping factor, is a natural number greater than or equal to 2, and can be varied according to filter design. L is set to 4 (L=4) in FIG. 4. The signal processed through the overlap and sum operation is finally fed to the analog stage.

Next, a description is given of a method and apparatus for repeated transmission in a PSF-based multicarrier system where neighboring symbols are partially overlapped.

Figure 5:
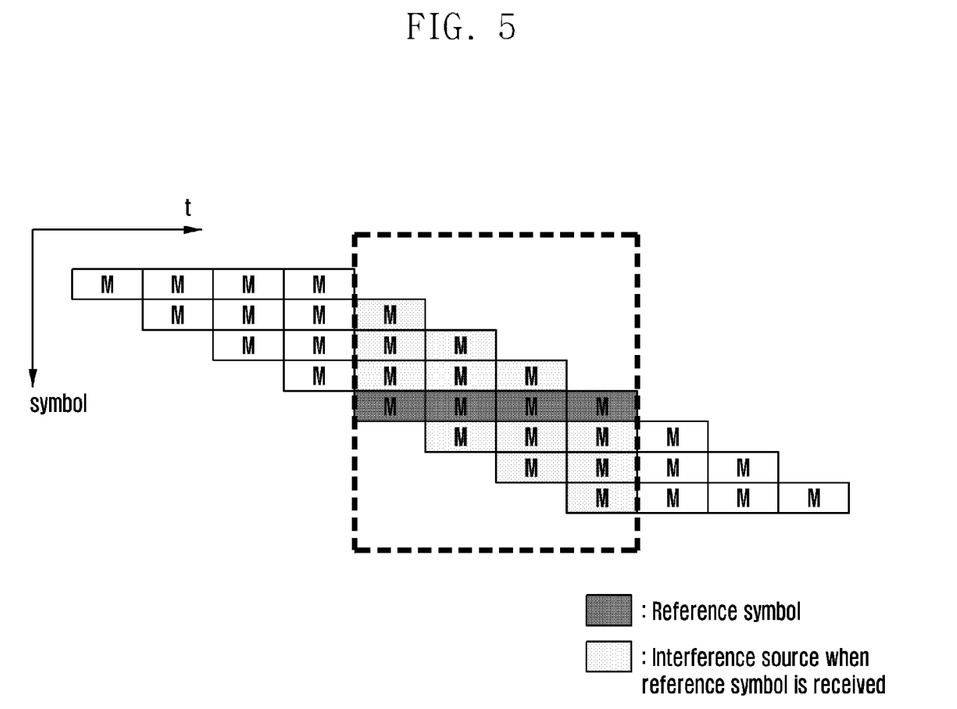
FIG. 5 illustrates the overlap and sum operation with repeated M-IFFT data according to an embodiment of the present disclosure.

FIG. 5 illustrates the overlap and sum operation with repeated M-IFFT data according to an embodiment of the present disclosure.

FIG. 5 depicts the overlap and sum operation after PSF processing of a signal obtained through M-IFFT and L times repetition in FIG. 3. Here, the length of each symbol is 4M and the overlapping factor L is 4 (L=4). It can be seen that each symbol corresponds to a pattern of M-IFFT data repeated L times. In response to data transmission, the receiver stores a received signal in a buffer of a given length. Thereafter, the receiver extracts one-symbol-length data from the buffer and decodes the extracted data. This process can be repeated.

For example, in FIG. 5, it is possible to decode partially overlapping signals by repeatedly extracting and decoding one-symbol-length (4M) data. Meanwhile, among neighboring symbols of a reference symbol, L symbols before the reference symbol and (L−1) symbols after the reference symbol overlap with the reference symbol. This can be reflected in the channel equalization algorithm as an interference source. Here, the number of symbols before the reference symbol is greater by 1 than that after the reference symbol, which reflects interference due to multipath fading in wireless channels.

Repeated transmission is one of simple but effective transmission schemes when the channel conditions are poor. Repeating the same data can reduce the efficiency of transmission. However, it is generally difficult to design high-performance error correcting codes with a very low code rate. Hence, repeated transmission can be well suited for transmitting data with a code rate of ⅓ or less.

Next, a more detailed description is given of repeated transmission of symbols in a multicarrier system allowing partial overlapping using a PSF.

Figure 6:
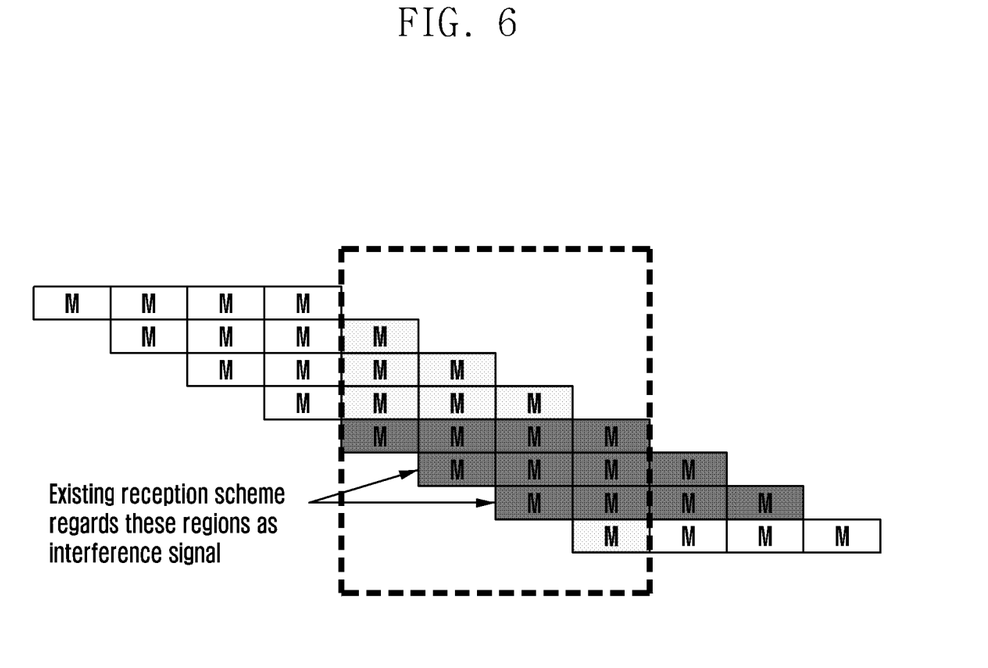
FIG. 6 illustrates repeated transmission of three symbols when the overlapping factor is 4 (L=4) according to an embodiment of the present disclosure.

FIG. 6 illustrates repeated transmission of three symbols when the overlapping factor is 4 (L=4) according to an embodiment of the present disclosure.

FIG. 6 shows an instance of FIG. 5 where the reference symbol is sent three times. In one embodiment, repeated transmission can indicate transmission using a symbol whose length is greater than the reference symbol length. That is, repeated transmission can produce an effect identical or corresponding to that of transmission using a symbol whose length is greater than the reference symbol length.

This effect is described from the perspective of transmission and reception. For the transmission perspective, one symbol consisting of 4-times repeated M-IFFT signals is element-wise multiplied by PSF coefficients, shifted by M, and added twice. In other words, the result of shifting PSF coefficients with a length of 4M by M followed by two additions can be identical to the result of element-wise multiplying one symbol consisting of 6-times repeated M-IFFT signals and new PSF coefficients with a length of 6M. That is, R-times repeated transmission of a multicarrier symbol with overlapping factor L can be regarded as one time transmission of a multicarrier symbol with overlapping factor (L+R−1). Here, to obtain the same result, (L+R−1) filter coefficients should be obtained by (R−1)-times shifting of L filter coefficients each by M followed by addition.

Figure 7:
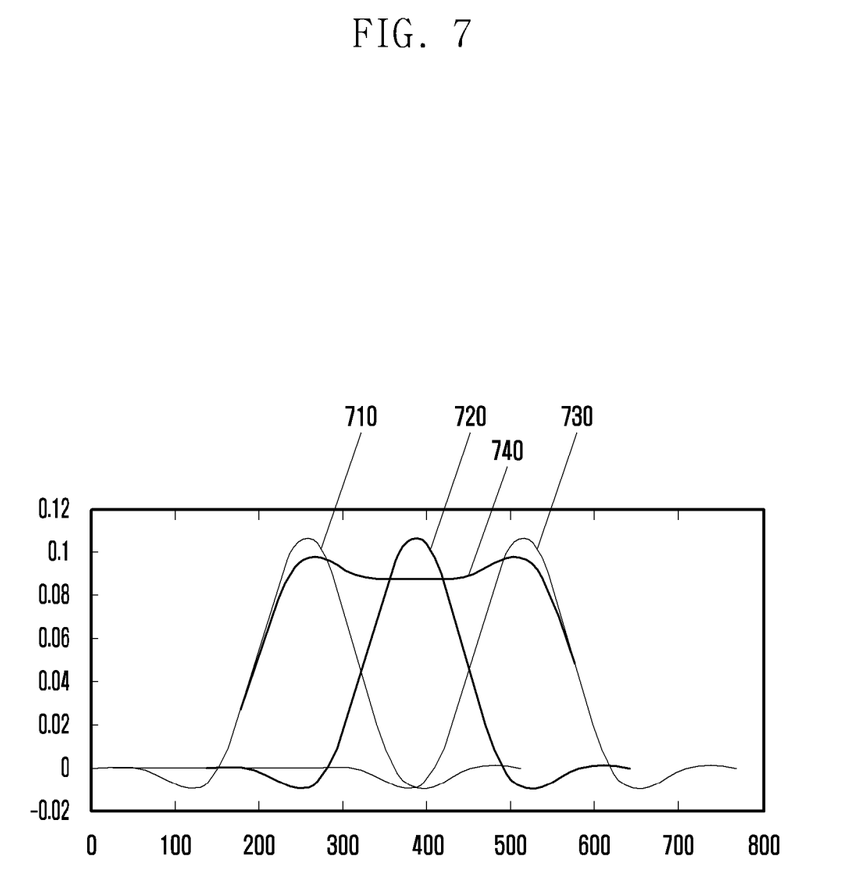
FIG. 7 illustrates filter coefficients according to an embodiment of the present disclosure.

FIG. 7 illustrates filter coefficients according to an embodiment of the present disclosure.

FIG. 7 depicts an instance of filter coefficients corresponding to the case shown in FIG. 6. In FIG. 7, M is 128 and L is 4 (that is, the symbol length is 512), and PSF coefficients are PHYDYAS filter coefficients. Indicia 710, 720 and 730 each indicate filter coefficients (PSF coefficients) applied to three successive symbols. Indicia 740 indicates filter coefficients corresponding to the element-wise sums of the filter coefficients indicated by indicia 710, 720 and 730. 3-times repeated transmission of a multicarrier symbol with overlapping factor 4 (FIG. 6) that is multiplied by the PSF coefficients indicated by indicia 710 (FIG. 7) can be identical to one time transmission of a multicarrier symbol with overlapping factor 6 (=4+3−1) that is multiplied by the PSF coefficients indicated by indicia 740 (FIG. 7).

The PSF coefficients indicated by indicia 740 (FIG. 7) and existing PHYDYAS filter coefficients (blue) are different in transmission spectrum. This is shown in FIG. 8.

Figure 8:
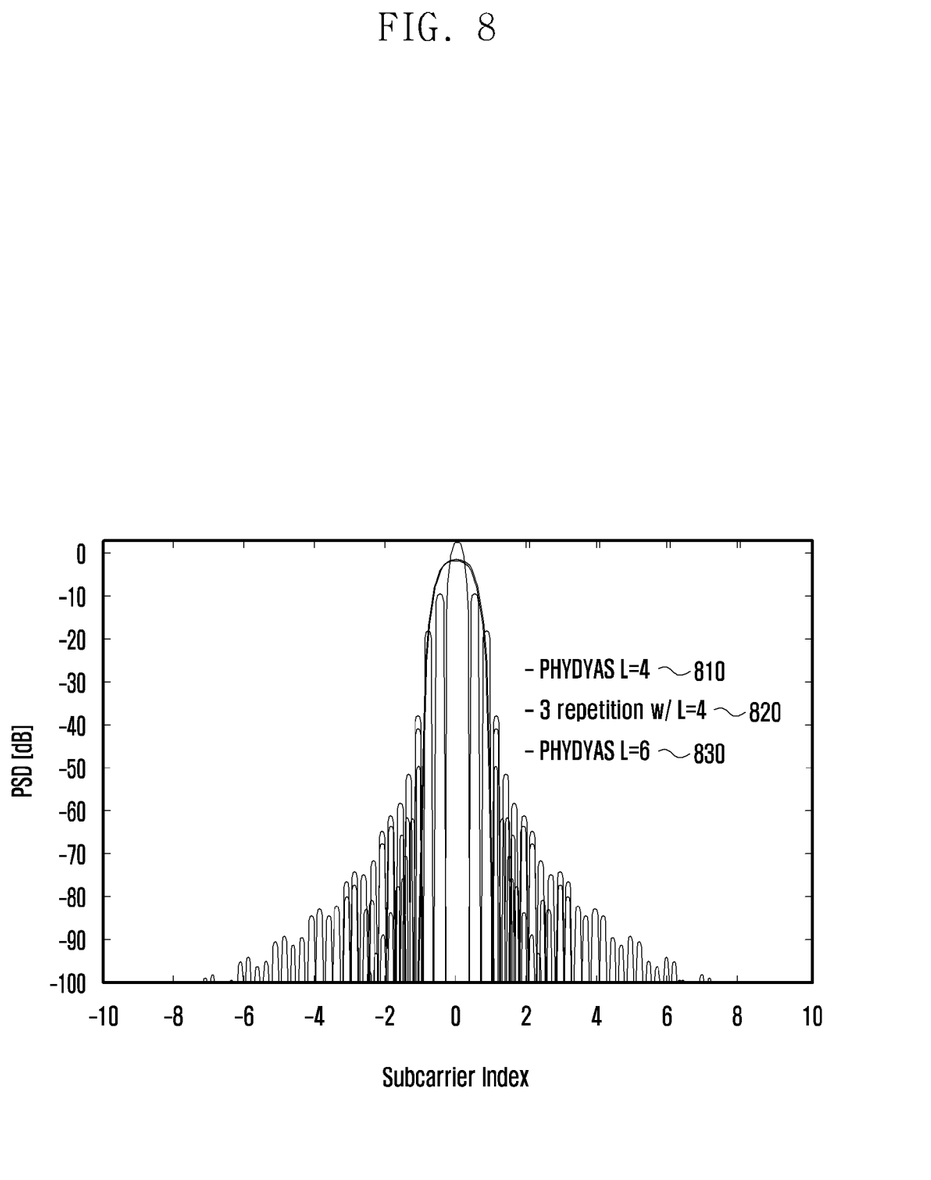
FIG. 8 illustrates spectrum improvement due to use of new filters in comparison with use of 3-times repeated filters according to an embodiment of the present disclosure.

FIG. 8 illustrates spectrum improvement due to use of new filters in comparison with use of 3-times repeated filters according to an embodiment of the present disclosure.

Referring to FIG. 8, it can be seen that 3-times repeated filters 820 are longer in the time domain and have a smaller side-lobe in the frequency domain compared to PHYDYAS filters with L=4 (810). Designing more elaborate filters can improve the spectrum confinement property as in the case of PHYDYAS filters with L=6 (830). That is, the extended length can increase the degree of freedom for improving frequency properties. Utilization of this extended length can facilitate inter-carrier interference (ICI) control when resources are allocated to users in a cellular system.

Next, a description is given of repeated transmission from the reception perspective. In a situation shown in FIG. 6, two successive symbols after the reference symbol have the same data as the reference symbol. However, an existing receiver can regard these symbols as interference for channel equalization or the like. A receiver for repeated transmission can regard these symbols as a signal (not interference) for decoding, enabling design of more elaborate reception.

In consideration of the above effects, there are proposed a transmission/reception scheme and apparatus enabling effective repeated transmission in a multicarrier system performing PSF-based overlap and sum operation for transmission.

As described above, in a multicarrier system performing PSF-based overlap and sum operation for transmission, repeated transmission is closely related to the overlapping factor of the PSF. Hence, as an embodiment of the present disclosure, in a multicarrier system with overlapping factor L, it is possible to send and receive signals through repeated transmission during an interval of length LM or more by adjusting filter coefficients in consideration of the symbol length and power factor.

Upon entering a cell, the user equipment can notify the base station of the value of the maximum overlapping factor ($L_{max}$) allowed to it.

The $L_{max}$ value corresponds to, but not limited to, the maximum number of samples ($=L_{max}M$) that can be read from the received signal buffer by the user equipment attempting to decode one symbol.

The maximum overlapping factor ($L_{max}$) can be determined in advance and stored in the base station and the user equipment at the system installation time.

When a need arises for repeated transmission to the user equipment, the base station can determine the number of symbols to cover the allocated interval for repeated transmission.

As the overlap and sum operation is performed on the basis of M-IFFT, the time resource can be allocated in units of an integer multiple of M-IFFT. When this integer is termed as $N_{alloc}$, the length for resource allocation becomes $N_{alloc}M$. When the default overlapping factor of the system is L, the total length covering the overlap with other resources becomes $(L+N_{alloc}-1)M$.

When symbols processed by the default PSF with the sum of powers associated with filter coefficients ($P_f$) are repeatedly sent, the number of repeated transmissions (R) becomes $N_{alloc}$ and the sum of transmit powers in this interval becomes $N_{alloc}P_f$. That is, the average transmit power per transmission unit (M-IFFT) remains to be $P_f$.

When repeated transmission is performed using an overlapping factor $L_{rep}$ larger than the default overlapping factor L ($L_{rep}>L$) during the above resource allocation length, the sum of powers associated with new filter coefficients corresponding to $L_{rep}$ is set equal to $N_{alloc}P_f/R$ so that the number of repeated transmissions (R) becomes $N_{alloc}-(L_{rep}-L)$ and the sum of transmit powers during the interval becomes $N_{alloc}P_f$. That is, the average transmit power per transmission unit (M-IFFT) remains to be $P_f$ although the overlapping factor changes, thereby causing repeated transmission to consume the same average power as regular transmission.

In the situation shown in FIG. 6, $N_{alloc}$ is set to 3. When $L_{rep}$ is set respectively to 4, 5 and 6, the number of repeated transmissions (R) becomes 3, 2 and 1, and the sum of powers associated with filter coefficients becomes $P_f$, $1.5P_f$ and $3P_f$. Thereby, the average transmit power during the corresponding interval remains to be $P_f$.

It is not possible to increase $L_{rep}$ without limit, and $L_{rep}$ should be less than or equal to $L_{max}$, which is notified by the user equipment upon entering a cell, ($L_{rep} \leq L_{max}$).

The base station can notify the above repeated transmission information to a scheduled user equipment through a control channel.

The information notified by the base station can include the new overlapping factor $L_{rep}$, the number of repeated transmissions (R), and corresponding filter coefficients. When sets of filter coefficients are agreed in advance between the transmitter side and the receiver side, only an index can be sent instead of filter coefficients.

The receiver side can adjust the combining count C for reception so that C does not exceed the maximum overlapping factor ($C \leq L_{max}$).

Here, C can be set to a value less than or equal to the number of repeated transmissions (R) sent by the transmitter side. When C is less than R (C<R), the receiver side does not use the filter coefficients corresponding to $L_{rep}$ without modification, and can perform decoding by using filters taking further partial sums corresponding to the decrement in the overlapping factor and perform combining operation (e.g. MRC).

A detailed description on decoding will be given later with reference to the following equation.

$$\underline{X}_R[0] = \sum_{k=1}^{L} W_N \begin{bmatrix} 0 & I_{N+M-kM} \\ 0 & 0 \end{bmatrix} HW_N^H \sum_{b=0}^{B-1} \sum_{s=0}^{M/B-1} \underline{P}_{T,b,s} D_{b,s}[-k] +$$

$$W_N [I_N \ 0] HW_N^H \sum_{b=0}^{B-1} \sum_{s=0}^{M/B-1} \underline{P}_{T,b,s} D_{b,s}[0] +$$

$$\sum_{k=1}^{L-1} W_N \begin{bmatrix} 0 & 0 \\ I_{N-kM} & 0 \end{bmatrix} HW_N^H \sum_{b=0}^{B-1} \sum_{s=0}^{M/B-1} \underline{P}_{T,b,s} D_{b,s}[k] + \underline{W}[0] =$$

$$H_f[0] \sum_{b=0}^{B-1} P_{T,b} D_b[0] + \sum_{k \neq 0, k=-L}^{L-1} H_f[k] \sum_{b=0}^{B-1} P_{T,b} D_b[k] + \underline{W}[0]$$

$$H_f[k] \triangleq W_N T[k] HW_N^H \triangleq \begin{cases} W_N \begin{bmatrix} 0 & I_{N+M-kM} \\ 0 & 0 \end{bmatrix} HW_N^H, & k < 0 \\ W_N [I_N \ 0] HW_N^H, & k = 0 \\ W_N \begin{bmatrix} 0 & 0 \\ I_{N-kM} & 0 \end{bmatrix} HW_N^H, & k > 0 \end{cases}$$

$$T[k] \triangleq \begin{cases} \begin{bmatrix} 0 & I_{N+M-kM} \\ 0 & 0 \end{bmatrix}, & k < 0 \\ [I_N \ 0], & k = 0 \\ \begin{bmatrix} 0 & 0 \\ I_{N-kM} & 0 \end{bmatrix}, & k > 0 \end{cases}$$

Figure 9:
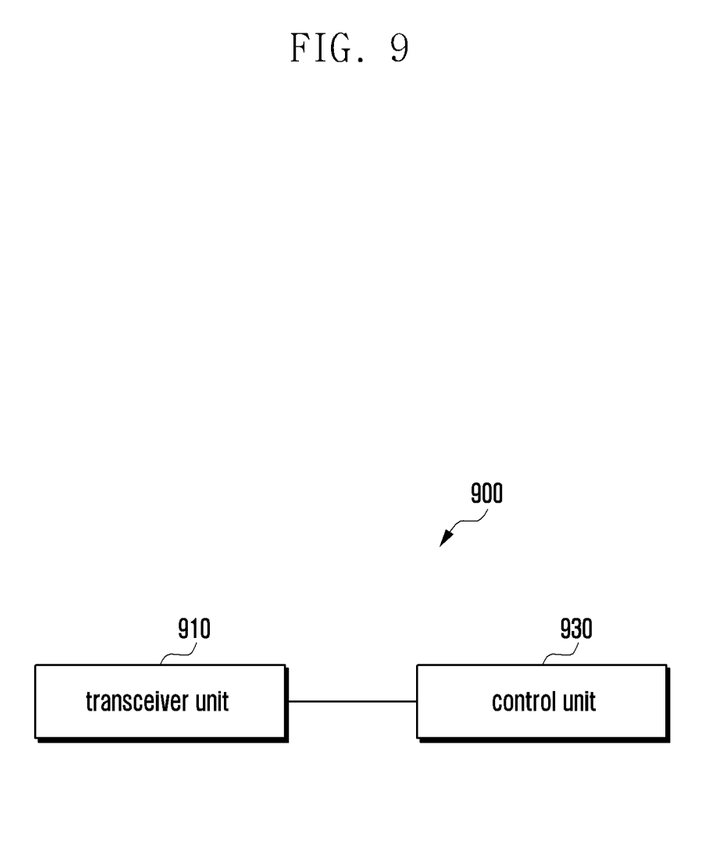
FIG. 9 is a block diagram of a base station according to an embodiment of the present disclosure.

FIG. 9 is a block diagram of a base station 900 according to an embodiment of the present disclosure.

Referring to FIG. 9, the base station 900 can include a transceiver unit 910 to send and receive signals, and a control unit 930 to control the overall operation of the base station 900. The control unit 930 can control operations of the base station 900 or FBMC symbol transmitter according to the embodiments described in connection with FIGS. 1 to 8.

Particularly, in a system with a given overlapping factor (L) and a given number of QAM FBMC symbols (M), the control unit 930 can control a process of determining to perform repeated transmission during an interval of length LM or more, determining information on the type of repeated transmission to be performed, and transmitting FBMC symbols using transmit power determined based on the repeated transmission type.

Here, the information on the type of repeated transmission can include information regarding a new overlapping factor, the number of repeated transmissions, and new filter coefficients. In addition, when the number of repeated transmissions is N, the length of a signal to be repeated can be (L+N-1)*M in consideration of an overlap with other symbols.

The control unit 930 can control reception of information on the maximum overlapping factor allowed to the user equipment therefrom.

Figure 10:
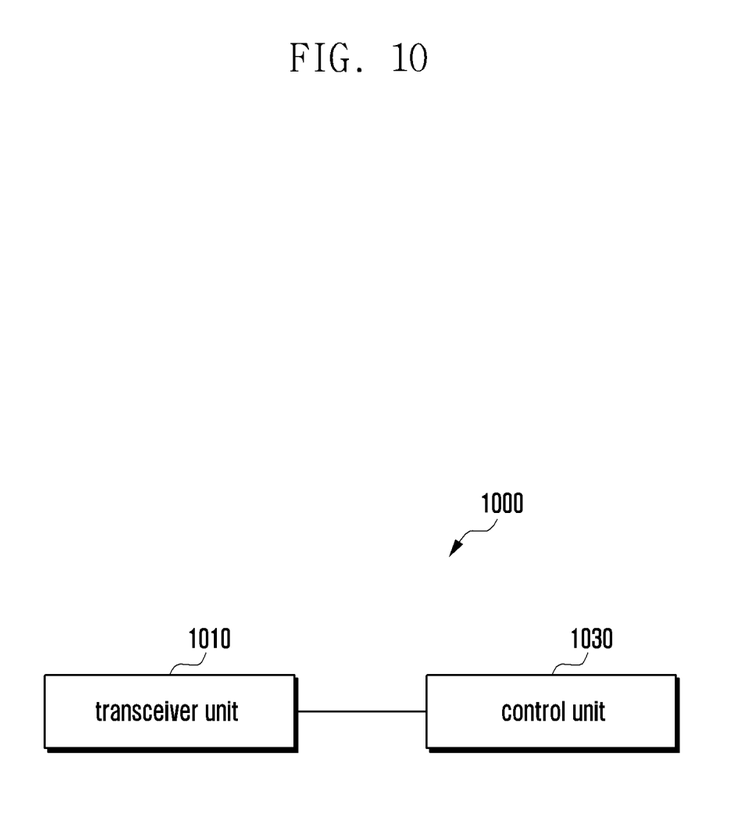
FIG. 10 is a block diagram of a user equipment according to an embodiment of the present disclosure.

FIG. 10 is a block diagram of a user equipment 1000 according to an embodiment of the present disclosure.

Referring to FIG. 10, the user equipment 1000 can include a transceiver unit 1010 to send and receive signals, and a control unit 1030 to control the overall operation of the user equipment 900. The control unit 1030 can control operations of the user equipment 1000 or FBMC symbol receiver according to the embodiments described in connection with FIGS. 1 to 8.

The control unit 1030 can control a process of sending information on the maximum overlapping factor allowed to the user equipment 1000 to a base station, receiving, for a system with a given overlapping factor (L) and a given number of QAM FBMC symbols (M), information on the type of repeated transmission to be performed during an interval of length LM or more from the base station, reconfiguring reception filters on the basis of the information on the type of repeated transmission, and receiving a signal by use of the reconfigured reception filters.

The information on the type of repeated transmission can include information regarding a new overlapping factor, the number of repeated transmissions, and new filter coefficients. In addition, when the number of repeated transmissions is N, the length of a signal to be repeated can be (L+N−1)*M in consideration of an overlap with other symbols.

The present invention can also applied to the followings: diagrams and equations describing transmitter/receiver operations based on base station configuration; embodiments for transmission/reception scheme in consideration of FDM (partial RB mapping); embodiments for repeated transmission over rectangular block type (not sliding type) resource structure (in case of block transmission); and examples of extensions to similar waveform like GFDM/FMT besides QAM-FBMC In a feature of the present disclosure, there are provided a method and apparatus for repeated transmission in a multicarrier wireless communication system.

Additionally, in a multicarrier wireless communication system performing an overlap and sum operation based on pulse shaping filters (PSF), repeated transmission may correspond to an increment in the overlapping factor of the filters, contributing to effective reduction of inter-carrier interference (ICI) and enhancement of reception performance.

Although the present disclosure has been described with an exemplary embodiment, various changes and modifications may be suggested to one skilled in the art. It is intended that the present disclosure encompass such changes and modifications as fall within the scope of the appended claims.

Figure 11:
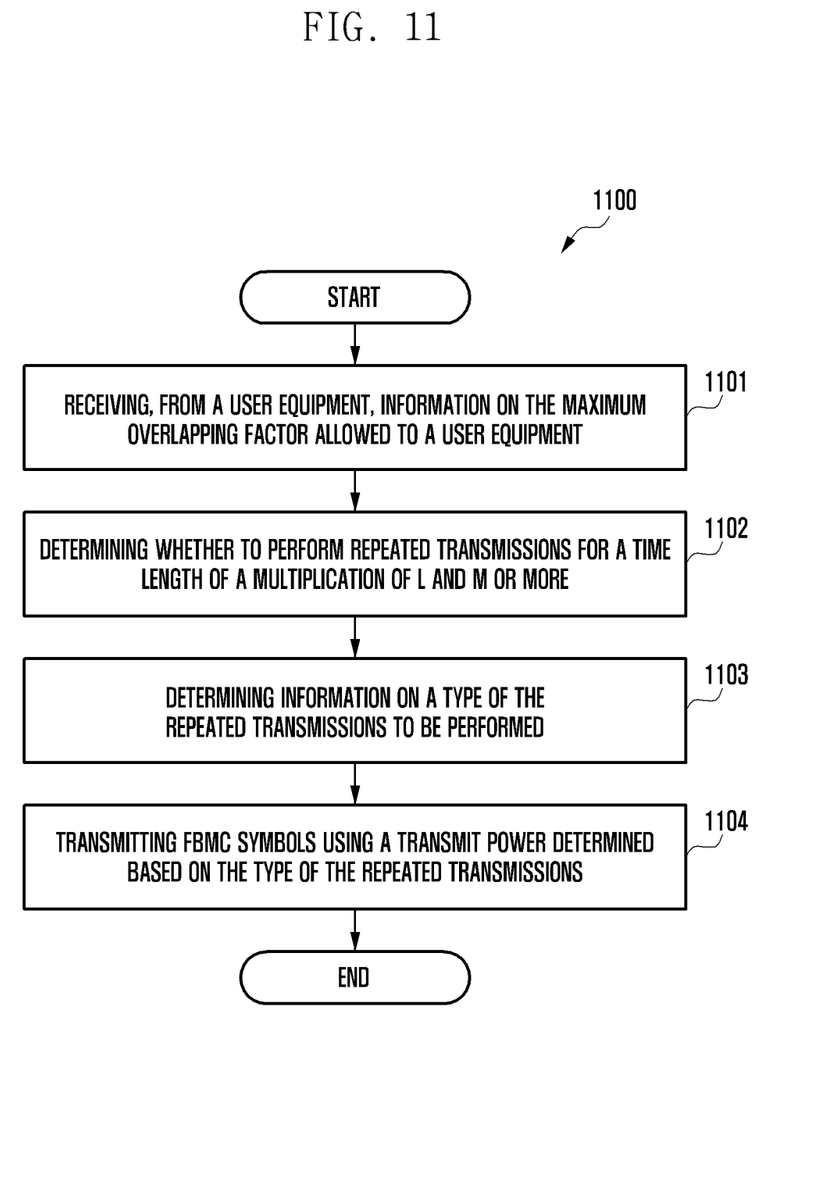
FIG. 11 illustrates a flowchart 1100 of a method for signal transmission in a filter bank multicarrier (FBMC) system.

FIG. 11 illustrates a flowchart 1100 of a method for signal transmission in a filter bank multicarrier (FBMC) system.

At step 1101, the method provides receiving, from a user equipment, information on the maximum overlapping factor allowed to a user equipment. At step 1102, the method provides determining whether to perform repeated transmissions for a time length of a multiplication of L and M or more, wherein L indicates the overlapping factor of the system and M indicates a number of quadrature amplitude modulation (QAM) filter bank multi-carrier (FBMC) symbols. At step 1103, the method provides determining information on a type of the repeated transmissions to be performed. At step 1104, the method provides transmitting FBMC symbols using a transmit power determined based on the type of the repeated transmissions.

Figure 12:
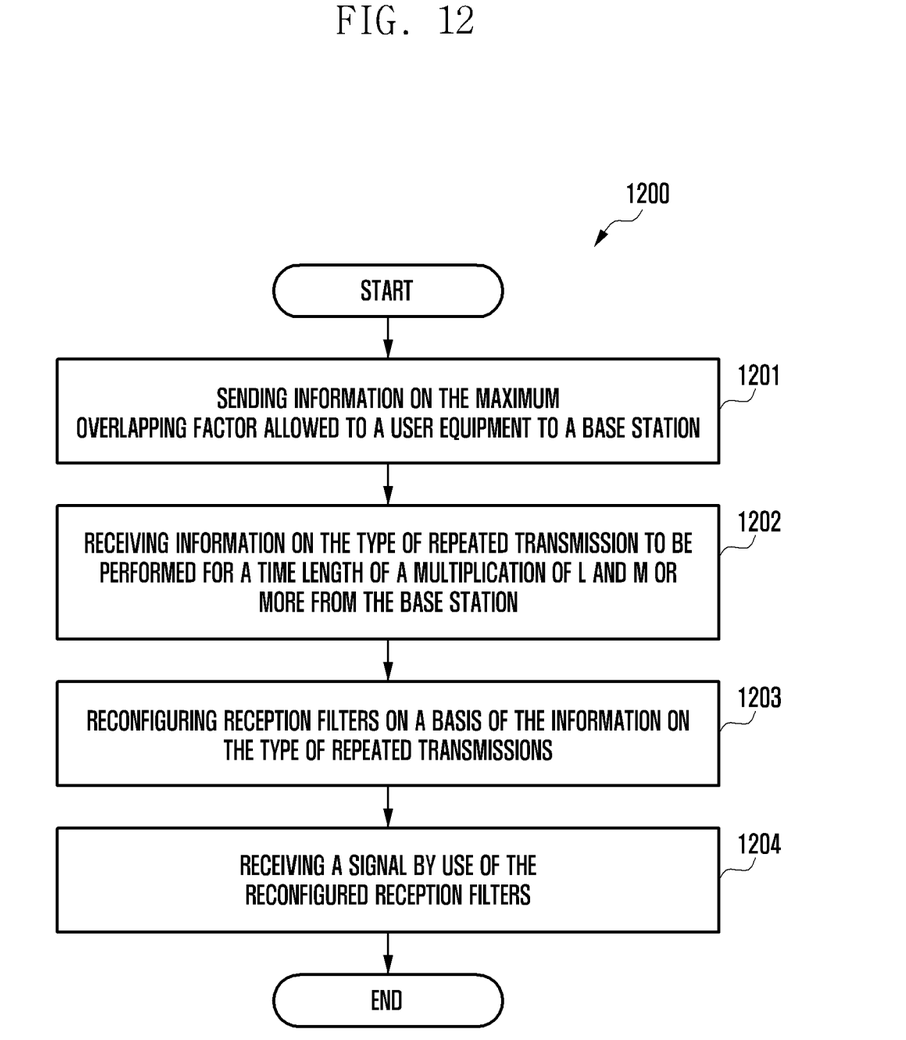
FIG. 12 illustrates a flowchart 1200 of a method for signal reception in a filter bank multicarrier (FBMC) system.

FIG. 12 illustrates a flowchart 1200 of a method for signal reception in a filter bank multicarrier (FBMC) system.

At step 1201, the method provides sending information on the maximum overlapping factor allowed to a user equipment to a base station. At step 1202, the method provides receiving information on the type of repeated transmission to be performed for a time length of a multiplication of L and M or more from the base station, when L indicates the overlapping factor of the system and M indicates the number of QAM FBMC symbols receiving information on the type of repeated transmission to be performed for a time length of a multiplication of L and M or more from the base station, when L indicates the overlapping factor of the system and M indicates the number of QAM FBMC symbols. At step 1203, the method provides reconfiguring reception filters on a basis of the information on the type of repeated transmissions. At step 1204, the method provides receiving a signal by use of the reconfigured reception filters.

What is claimed is:

1. A method for signal transmission in a filter bank multicarrier (FBMC) system, the method comprising:
   determining repeated transmissions for a time length greater than a product of L*M, wherein L is a numeric value that indicates an overlapping factor of the system and M indicates a length of an inverse fast Fourier transform (IFFT) signal of quadrature amplitude modulation (QAM) filter bank multi-carrier (FBMC) symbols;
   determining information on a type of the repeated transmissions; and
   transmitting a signal summed by the QAM FBMC symbols using a transmit power determined based on the type of the repeated transmissions.

2. The method of claim 1, wherein the information on the type of the repeated transmissions comprises information regarding a new overlapping factor, a number of the repeated transmissions, and new filter coefficients.

3. The method of claim 1, wherein, if an N is a numeric value that indicates a number of the repeated transmissions, a length of the signal is set to a product of (L+N−1)*M in consideration of an overlap with other symbols.

4. The method of claim 1, further comprising receiving, from a user equipment, information on the maximum overlapping factor allowed to the user equipment.

5. A base station in a filter bank multicarrier (FBMC) system, the base station comprising:
   a transceiver to transmit and receive signals; and
   a controller configured to:
      determine repeated transmissions for a time length greater than a product of L*M, wherein L is a numeric value that indicates an overlapping factor of the system and M is a numeric value that indicates a length of an inverse fast Fourier transform (IFFT) signal of quadrature amplitude modulation (QAM) FBMC symbols;
      determine information on a type of the repeated transmissions; and
      transmit a signal summed by the QAM FBMC symbols using a transmit power determined based on the type of the repeated transmissions.

6. The base station of claim 5, wherein the information on the type of the repeated transmissions comprises information regarding a new overlapping factor, a number of the repeated transmissions, and new filter coefficients.

7. The base station of claim 5, wherein, if an N indicates a number of the repeated transmissions, a length of the signal to be repeated is set to a product of (L+N−1)*M in consideration of an overlap with other symbols.

8. The base station of claim 5, wherein the controller is further configured to control receiving, from a user equipment, information on the maximum overlapping factor allowed to the user equipment.

9. A method for signal reception in a filter bank multi-carrier (FBMC) system, the method comprising:
   transmitting information on a maximum overlapping factor allowed to a user equipment to a base station;
   receiving, from the base station, information on a type of repeated transmissions to be performed for a time length greater than a product of L*M, wherein L is a numeric value that indicates an overlapping factor of the system and M indicates a length of an inverse fast Fourier transform (IFFT) signal of quadrature amplitude modulation (QAM) FBMC symbols;
   reconfiguring reception filter coefficient based on the information on the type of the repeated transmissions; and
   receiving a signal by use of the reconfigured reception filter coefficient.

10. The method of claim 9, wherein the information on the type of the repeated transmissions comprises information regarding a new overlapping factor, a number of the repeated transmissions, and new filter coefficients.

11. The method of claim 9, wherein, if an N is a numeric value that indicates a number of the repeated transmissions, a length of the signal is set to a product of (L+N−1)*M in consideration of an overlap with other symbols.

12. A user equipment in a filter bank multicarrier (FBMC) system, the user equipment comprising:
   a transceiver configured to transmit and receive signals; and
   a controller configured to:
      transmit information on a maximum overlapping factor allowed to the user equipment to a base station;
      receive information on a type of repeated transmissions to be performed for a time length greater than a product of L*M, wherein L is a numeric value that indicates an overlapping factor of the system and M is a numeric value that indicates a number of quadrature amplitude modulation (QAM) FBMC symbols,
      reconfigure reception filter coefficient based on the information on the type of the repeated transmissions; and
      receive a signal by use of the reconfigured reception filter coefficient.

13. The user equipment of claim 12, wherein the information on the type of the repeated transmissions comprises information regarding a new overlapping factor, a number of the repeated transmissions, and new filter coefficients.

14. The user equipment of claim 12, wherein, if the N is a numeric value that indicates a number of the repeated transmissions, a length of the signal is set to a product of (L+N−1)*M in consideration of an overlap with other symbols.

* * * * *